United States Patent
Baumann et al.

(10) Patent No.: US 9,643,359 B2
(45) Date of Patent: *May 9, 2017

(54) METHOD AND DEVICE FOR PRODUCTION OF THREE-DIMENSIONAL OBJECTS BY MEANS OF ELECTROMAGNETIC RADIATION AND APPLICATION OF AN ABSORBER BY MEANS OF AN INK-JET METHOD

(75) Inventors: Franz-Erich Baumann, Duelmen (DE); Maik Grebe, Bochum (DE); Sylvia Monsheimer, Haltern am See (DE)

(73) Assignee: EVONIK DEGUSSA GmbH, Essen (DE)

(*) Notice: Subject to any disclaimer, the term of this patent is extended or adjusted under 35 U.S.C. 154(b) by 476 days.

This patent is subject to a terminal disclaimer.

(21) Appl. No.: 11/587,758

(22) PCT Filed: Mar. 3, 2005

(86) PCT No.: PCT/EP2005/050949
§ 371 (c)(1),
(2), (4) Date: Feb. 22, 2007

(87) PCT Pub. No.: WO2005/105412
PCT Pub. Date: Nov. 10, 2005

(65) Prior Publication Data
US 2007/0238056 A1    Oct. 11, 2007

(30) Foreign Application Priority Data
Apr. 27, 2004 (DE) .................. 10 2004 020 452

(51) Int. Cl.
*B29C 67/00* (2017.01)
*B29C 35/08* (2006.01)

(52) U.S. Cl.
CPC .......... *B29C 67/0077* (2013.01); *B29C 35/08* (2013.01); *B29C 67/007* (2013.01); *B29C 67/0081* (2013.01)

(58) Field of Classification Search
CPC .. B29C 35/08; B29C 67/0077; B29C 67/0081
(Continued)

(56) References Cited

U.S. PATENT DOCUMENTS 4,247,508 A * 1/1981 Housholder .................. 264/219
4,317,766 A * 3/1982 Kawasaki et al. ............ 524/101
(Continued)

FOREIGN PATENT DOCUMENTS

CA    2 371 181 A1    11/2000
CA    2371181    *    11/2000    ............. B29C 67/00
(Continued)

OTHER PUBLICATIONS

U.S. Appl. No. 12/105,672, filed Apr. 18, 2008, Simon, et al.
(Continued)

*Primary Examiner* — Jeremiah Smith
(74) *Attorney, Agent, or Firm* — Oblon, McClelland, Maier & Neustadt, L.L.P.

(57) ABSTRACT

The present invention relates to a process for the bonding of material for the production of three-dimensional objects by selective heating with electromagnetic energy which is either non-coherent and/or non-monochromatic and/or non-oriented, with a wavelength of from 100 nm to 1 mm.

20 Claims, 1 Drawing Sheet

(58) Field of Classification Search
USPC .......................................................... 264/497
See application file for complete search history.

(56) References Cited

U.S. PATENT DOCUMENTS

| | | | | |
|---|---|---|---|---|
| 5,352,405 | A | * | 10/1994 | Beaman et al. ................ 419/45 |
| 5,425,817 | A | | 6/1995 | Mugge et al. |
| 5,980,813 | A | * | 11/1999 | Narang et al. ................ 264/401 |
| 6,147,138 | A | * | 11/2000 | Hochsmann et al. ........ 523/139 |
| 6,177,232 | B1 | * | 1/2001 | Melisaris et al. ........... 430/280.1 |
| 6,413,697 | B1 | * | 7/2002 | Melisaris et al. ........... 430/280.1 |
| 6,482,199 | B1 | * | 11/2002 | Neev ................................ 606/10 |
| 6,531,086 | B1 | * | 3/2003 | Larsson ........................ 264/497 |
| 6,884,485 | B2 | | 4/2005 | Baumann et al. |
| 7,135,525 | B2 | | 11/2006 | Petter et al. |
| 7,211,615 | B2 | | 5/2007 | Baumann et al. |
| 2001/0002287 | A1 | * | 5/2001 | Kar et al. ...................... 427/554 |
| 2001/0050031 | A1 | * | 12/2001 | Bredt et al. ................. 106/162.9 |
| 2002/0105114 | A1 | | 8/2002 | Kubo et al. |
| 2004/0004303 | A1 | * | 1/2004 | Iskra ............................. 264/109 |
| 2004/0102539 | A1 | | 5/2004 | Monsheimer et al. |
| 2004/0106691 | A1 | | 6/2004 | Monsheimer et al. |
| 2004/0137228 | A1 | | 7/2004 | Monsheimer et al. |
| 2004/0138363 | A1 | | 7/2004 | Baumann et al. |
| 2004/0232583 | A1 | | 11/2004 | Monsheimer et al. |
| 2005/0014842 | A1 | | 1/2005 | Baumann et al. |
| 2005/0027047 | A1 | | 2/2005 | Monsheimer et al. |
| 2005/0027050 | A1 | | 2/2005 | Monsheimer et al. |
| 2005/0038201 | A1 | | 2/2005 | Wursche et al. |
| 2006/0071359 | A1 | | 4/2006 | Monsheimer et al. |
| 2006/0134419 | A1 | | 6/2006 | Monsheimer et al. |
| 2006/0182916 | A1 | | 8/2006 | Dowe et al. |
| 2006/0183869 | A1 | | 8/2006 | Dowe et al. |
| 2006/0189784 | A1 | | 8/2006 | Monsheimer et al. |
| 2006/0202395 | A1 | | 9/2006 | Monsheimer et al. |
| 2006/0223928 | A1 | | 10/2006 | Monsheimer et al. |
| 2006/0244169 | A1 | | 11/2006 | Monsheimer et al. |
| 2006/0281873 | A1 | | 12/2006 | Alting et al. |
| 2007/0055044 | A1 | | 3/2007 | Simon et al. |
| 2007/0104971 | A1 | | 5/2007 | Wursche et al. |
| 2007/0166560 | A1 | | 7/2007 | Wursche et al. |
| 2007/0260014 | A1 | | 11/2007 | Simon et al. |
| 2008/0119632 | A1 | | 5/2008 | Baumann et al. |
| 2008/0166529 | A1 | | 7/2008 | Hager et al. |
| 2008/0213552 | A1 | | 9/2008 | Hager et al. |
| 2008/0217821 | A1 | | 9/2008 | Goring et al. |
| 2008/0242782 | A1 | | 10/2008 | Hager et al. |
| 2008/0249237 | A1 | | 10/2008 | Hager et al. |
| 2009/0088508 | A1 | | 4/2009 | Monsheimer et al. |
| 2011/0252618 | A1 | | 10/2011 | Diekmann et al. |

FOREIGN PATENT DOCUMENTS

| | | |
|---|---|---|
| DE | 199 18 981 | 11/2000 |
| EP | 1 411 087 | 4/2004 |
| JP | 11-42712 A | 2/1999 |
| JP | 2002-264221 A | 9/2002 |
| JP | 2002-542080 | 12/2002 |
| JP | 2003-328220 A | 11/2003 |
| JP | 2004-114685 A | 4/2005 |
| WO | 01 38061 | 5/2001 |
| WO | 2005 011959 | 2/2005 |

OTHER PUBLICATIONS

U.S. Appl. No. 10/590,935, filed Aug. 28, 2006, Monsheimer, et al.
U.S. Appl. No. 10/592,952, filed Sep. 15, 2006, Monsheimer, et al.
U.S. Appl. No. 11/587,795, filed Oct. 27, 2006, Monsheimer, et al.
U.S. Appl. No. 11/596,365, filed Nov. 14, 2006, Monsheimer, et al.
U.S. Appl. No. 11/484,593, filed Jul. 12, 2006, Monsheimer, et al.
U.S. Appl. No. 11/561,021, filed Nov. 17, 2006, Simon, et al.
U.S. Appl. No. 11/694,129, filed Mar. 30, 2007, Monsheimer, et al.
U.S. Appl. No. 11/671,820, filed Feb. 6, 2007, Monsheimer, et al.
U.S. Appl. No. 12/131,425, filed Jun. 2, 2008, Monsheimer, et al.
U.S. Appl. No. 12/089,926, filed Jun. 4, 2008, Haeger, et al.
U.S. Appl. No. 11/816,556, filed Jan. 28, 2008, Wursche, et al.
U.S. Appl. No. 12/192,208, filed Aug. 15, 2008, Goering, et al.
U.S. Appl. No. 12/989,899, filed Oct. 27, 2010, Wurshche, et al.
Validity Opinion mailed Feb. 18, 2011 in Japanese Patent Publication No. 2007-510005 published Apr. 19, 2007.
U.S. Appl. No. 13/364,458, filed Feb. 2, 2012, Grebe, et al.
U.S. Appl. No. 13/552,842, filed Jul. 19, 2012, Grebe, et al.
U.S. Appl. No. 13/552,891, filed Jul. 19, 2012, Grebe, et al.
MacIsaac et al, "Basic Physics of the Incandescent Lamp (Lightbulb)", The Physics Teacher, 1999, vol. 37, pp. 520-525.
http://zeiss-campus.magnet.fsu.edu/articles/lightsources/images/xenonlampsfigure1.jpg accessed Jan. 10, 2013 (1 p.).
http://zeiss-campus.magnet.fsu.edu/articles/lightsources/images/tungstenlampsfigure1 . . . accessed Jan. 10, 2013—(1 p.).
U.S. Appl. No. 12/407,065, filed Mar. 19, 2009, Monsheimer, et al.

* cited by examiner

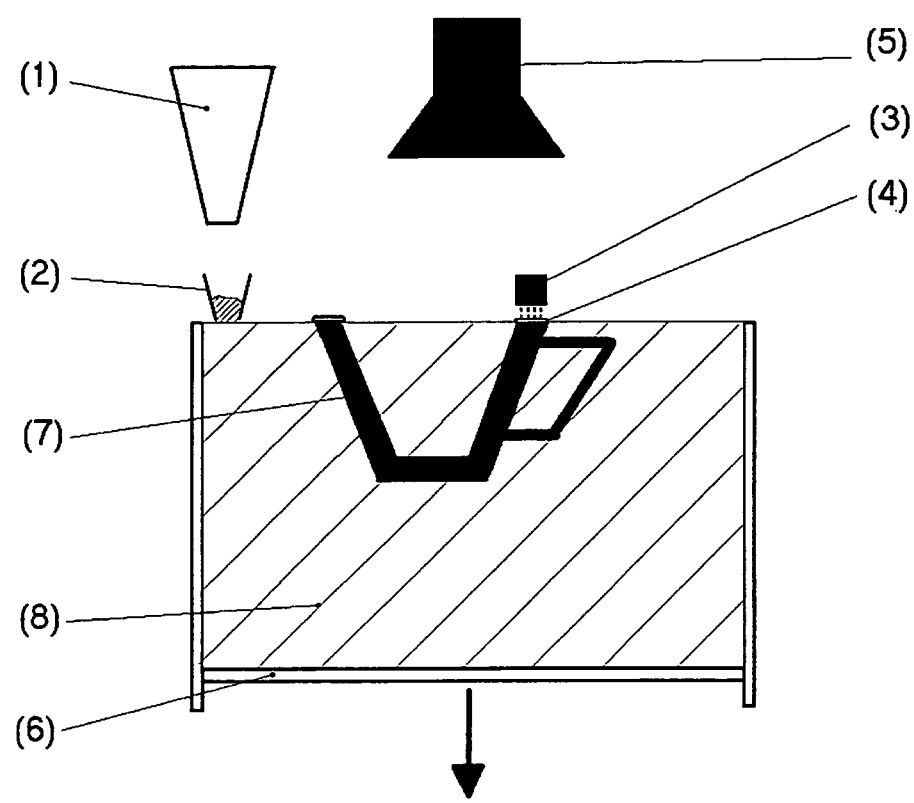

METHOD AND DEVICE FOR PRODUCTION OF THREE-DIMENSIONAL OBJECTS BY MEANS OF ELECTROMAGNETIC RADIATION AND APPLICATION OF AN ABSORBER BY MEANS OF AN INK-JET METHOD

The invention relates to a process for the production of three-dimensional objects from a pulverulent substrate via bonding, e.g. via fusion or sintering of portions of the substrate, where the pulverulent substrate is applied layer-by-layer, and the electromagnetic energy needed for the melting of the substrate is generated via an either non-oriented and/or non-monochromatic and/or non-coherent energy source of wavelength from 100 nm to 1 mm, and passed into an absorber, by way of which it is dissipated to the subregions of the substrate. These subregions are thereby melted layer-by-layer and bond, after cooling, to give the desired molding.

A task often encountered in very recent times is the rapid production of prototypes. One method described in the prior art is stereolithography, which has the disadvantage of needing complicated support structures during the preparation of the prototype from a liquid (resin), and the disadvantage that the resultant prototypes have relatively poor mechanical properties, these being attributable to the limited number of starting materials.

The other process often mentioned in the prior art and having good suitability for rapid prototyping is selective laser sintering (SLS), which has now become widespread. In this process, polymer powders or plastics-encapsulated particles of metal, of ceramic, or of sand are selectively and briefly irradiated with a laser beam in a chamber, thus melting the powder particles impacted by the laser beam. The molten particles coalesce and solidify relatively rapidly again to give a solid mass. This process can produce complex three-dimensional bodies simply and rapidly, via repeated irradiation of a succession of newly applied layers.

The process of laser-sintering (rapid prototyping) to realize moldings composed of pulverulent polymers is described in detail in the patent specifications U.S. Pat. No. 6,136,948 and WO 96/06881 (both DTM Corporation). The SLS processes described in the prior art have the disadvantage that expensive laser technology is needed for the process. The laser functioning as energy source is extremely expensive and sensitive, as also is the optical equipment needed for the provision and control of the laser beam, for example lenses, expanders, and deflector mirrors.

A disadvantage of the known process is that it cannot use some of the lasers available on the market. In order to permit sintering of polymer powder or of particles encapsulated with plastic, a $CO_2$ laser is required, which is expensive to purchase and expensive to service, operate, and maintain. A characteristic feature of the $CO_2$ laser is the wavelength of 10 600 nm. This corresponds to the far infrared region. A complicated mirror system therefore has to be used in order to conduct the laser beam across the construction plane; in addition, the laser requires constant cooling. Optical conductors cannot be used. Specifically trained operating staff generally have to be made available. Many end users are therefore unable to use these systems. However, use cannot be made of lower-cost lasers of wavelength in the middle or near infrared region, in the visible light region, or the ultraviolet region, because these cannot generally melt plastics, or not to the extent required for laser sintering. For the same reasons, it is not possible to use energy sources which are markedly less expensive and which emit radiation in either non-coherent and/or non-monochromatic and/or non-oriented form, e.g. radiative heaters or lamps. When using these sources it is also difficult to introduce the radiation into the construction space in such a way as to melt only precisely defined regions. However, the use of non-laser energy sources would have enormous advantages in terms of costs, ease of operation, and flexibility.

Although WO 01/38061 describes a process which operates with low-cost energy sources in combination with what are known as inhibitors, which are intended to inhibit sintering or melting in the edge region of the component, this process is attended by significant disadvantages, for example in that the inhibitor-treated powder cannot be recycled, and powder without inhibitor is also melted out-with the actual component, with the result that this powder material, too, can likewise not be reused. Large-surface application of inhibitor is needed for undercuts and cross-section changes, and this is attended by a marked loss of performance in terms of construction speed.

It was therefore an object of the present invention to develop a process which can produce sintered prototypes at lower cost without the disadvantages described above.

Surprisingly, it has now been found, as described in the claims, that moldings can be produced via a process using non-laser sources of electromagnetic energy, the radiation from which is non-coherent and/or non-monochromatic and/ or non-oriented, if a specific absorber is selectively applied via an inkjet process to those regions to be melted of the respective powder layer, and passes the heat produced via the introduction of electromagnetic energy from the absorber to the particles to be sintered. A particular advantage is that the energy can be introduced in spread form; however, the beam spot here may also be smaller than the construction surface, and, by way of example, the energy source may be of linear form and the introduction of energy may take place over the entire construction surface via a relative movement of the energy source and of the construction platform with respect to one another. The selectivity is achieved solely via the application of the absorber. The resultant achievable precision and speed of the process are therefore the same as, or higher than, those obtained with conventional laser sintering using a laser, mostly a $CO_2$ laser. The process is markedly less expensive, more flexible, and simpler to operate. The costs for the operation of a suitable lamp or of a suitable radiative heater are well below those for a laser. There is also greater flexibility in the selection of the pulverulent substrates. Another important factor is that the process has high potential for precision of the resultant moldings, because the precision of the inkjet process can be used to place the absorber on the substrate. It is also possible to use the inkjet process to give the final product other properties or to print it during the production process, for example with conductive regions or inks.

The energy sources used generate electromagnetic radiation which is non-coherent and/or non-monochromatic and/ or non-oriented, in the range from 100 nm to 1 mm. Light may be called a special case of electromagnetic radiation and has a wavelength in the region visible to the human eye, i.e. from 380 to 780 nm. This radiation is expressly not laser beams, which are mostly coherent and monochromatic and oriented. Although the energy sources used in the inventive process may also comply with these features, they do not simultaneously comply with all of the features listed. The radiation may lie in the visible-light region or in the near, middle, or far infrared region, or else in the ultraviolet region, preferably in the visible region and in the near infrared region. The energy transfer takes place by way of convection and by way of radiation, the latter being preferred. Lamps or radiative heaters are used in the simplest case. Without any intention of restricting the invention thereto, these may be incandescent lamps, halogen lamps, fluorescent lamps, or high-pressure discharge lamps. The radiative source may therefore be a glowing wire, for example with one or two spirals, and the embodiment may be an incandescent lamp or a halogen lamp; the spectrum of the emitted radiation is more likely to extend into the infrared region than into the ultraviolet region. The lamp may have been filled with various gases and vapors, halogens in the case of the halogen lamps, or else may be a vacuum lamp.

Another embodiment uses gas discharges as a source of radiation, known principles of action being high-pressure discharge and low-pressure discharge. Gas-discharge lamps have been filled with a widely used gas; these may be gaseous metals or noble gases, for example neon, xenon, argon, krypton, or mercury, including doping with, by way of example, iron or gallium, or else may be vapors using mercury, using metal halides, using sodium, or using rare earths. The embodiments are known, respectively, as high-pressure mercury vapor lamps, metal vapor halogen lamps, high-pressure sodium vapor lamps, long-arc xenon lamps, low-pressure sodium vapor lamps, UV lamps, fluorescent lamps, or fluorescent tubes. Use may also be made of mixed-light lamps which combine an incandescent lamp with a high-pressure mercury vapor lamp.

Another possible type of radiation source is a solids-discharge source; these are known as luminous sheets (electroluminescent sheets). Use may also be made of light-emitting diodes, which use the electroluminescence principle with direct semiconductor junctions or with indirect junctions with isoelectronic recombination centers. By way of example, in order to convert the UV radiation in low-pressure mercury vapor lamps into visible light use is made of what are known as phosphors. These are very pure crystals provided with precisely defined contaminants (doping). The inorganic crystals are mostly phosphates, silicates, tungstates, vanadates, used either individually or else in combination.

If use is made of a radiative heater, it preferably radiates in the near infrared or middle infrared region, the near infrared region (infrared A) encompassing a wavelength of from 780 nm to 1400 nm, and the middle infrared region (IR-B) encompassing a wavelength of from 1400 nm to 3000 nm. Use is also made of the far infrared region (IR-C) with a wavelength of from 3000 nm to 1 mm, but careful matching of the substrate and of the absorber is needed here, because when plastics are used as substrate the substrate, too, can absorb sufficient energy for sintering when IR-C is used. This can be countered via suitable selection of substrate, and adjustment of the absorption difference between absorber-covered regions and untreated regions. However, preference is given to the near infrared and middle infrared range. The radiative heater for the infrared region encompasses short-wavelength IR sources, e.g. halogen IR sources, quartz tube sources, and also ceramic sources or metal tube sources.

The radiative sources may have a broad emitted wavelength spectrum, mainly in the visible range, in the infrared range, or in the ultraviolet range, or else may emit radiation with individual narrow ranges of wavelength which are almost non-continuous. An example which may be mentioned is the low-pressure sodium vapor lamp, which almost exclusively emits radiation in the range from 560 to 600 nm. The absorber and the radiation source used are preferably matched to one another. Depending on the radiation source, power may be from 10 to 10 000 watts. Typical color temperatures are from 800 to 10 000 K. The radiation source may be of spot form, linear form, or spread form. It is also possible to combine two or more radiation sources. To improve utilization of the energy, use may be made of reflectors or refractors. It is also possible to use screens to emit better directional control of the radiation.

Depending on the substrate used, it can be advantageous to remove UV radiation from the spectrum of the lamp by means of suitable filters. Aging of plastics, in particular, is very rapid in this region, and specifically for these substrates the region between 100 and 400 nm is not within the preferred embodiment of the process.

In order to be able to melt the inventive powder or portions thereof layer-by-layer, the process parameters have to be selected appropriately. Examples of factors relevant here are the layer thickness, the power and the wavelength of the energy source, and the powder used, and in particular the absorber, and also the amount of absorber applied per unit surface area, and the duration of exposure to the electromagnetic energy.

It is advantageous to adapt the amount of absorber to the characteristics of the component; by way of example, less absorber may be applied in the middle of an area, particularly if by this stage there are some molten areas lying thereunder. Another advantage can be achieved if the first layer of a region to be melted is coated with absorber using a method different from that for the subsequent layers.

Absorption is defined as attenuation of the energy of a beam (light, electrons, etc.) on passage through matter. The dissipated energy here is converted into other forms of energy, e.g. heat. An absorber is correspondingly a piece of matter, or body, intended to absorb radiation (from WorldWideWeb.wissen.de). An absorber in this text is intended to mean an additive which can absorb all of, or a major proportion of, radiation in the region from 100 to 1 mm; it is sufficient here for portions of the absorber to exert this function.

The present invention therefore provides a process for producing a three-dimensional object, which comprises the steps of
a) providing a layer of a pulverulent substrate
b) controlling the temperature of the manufacturing chamber
c) selective application of an absorber in a suspension or of a liquid absorber via an inkjet process to the regions to be sintered
d) application of other specific liquids or suspensions with certain properties
e) selective melting of regions of the powder layer by means of introduction of electromagnetic energy, which is either non-oriented, and/or non-monochromatic and/or non-coherent, via a laser of wavelength from 100 nm to 1 mm, by means of radiative heaters in the IR-A and/or IR-B region, or using lamps in the visible or IR-A, and/or IR-B region
f) cooling of the molten and non-molten regions to a temperature which allows the moldings to be removed intact
g) removal of the moldings,
and also provides moldings produced by this process. Steps a) to e) here are repeated until the desired molding has been fashioned layer-by-layer. Step b) is material-dependent and therefore optional. Step d) is likewise optional. The thickness of the layer applied is, by way of example, from 0.05 to 2 mm, preferably from 0.08 to 0.2 mm.

An alternative sequence consists in omitting step e) in the first layer and carrying it out from the second layer onward as an alternative after step a). This leads to fusion of the powder particles precisely in the boundary layer between the uppermost powder layer and the powder layer situated thereunder, giving particularly good bonding and moreover increasing the amount of processing latitude, because the result is substantial elimination of curl (roll-up of the edges or ends of the molten regions).

In another alternative sequence, step e) is not carried out in every cycle, but only at intervals, or in the extreme case indeed only once immediately before steps f) and g).

Surprisingly, it has been found to be relatively simple to produce three-dimensional objects from pulverulent substrates by means of introduction of either non-oriented and/or non-monochromatic and/or non-coherent electromagnetic energy of wavelength from 100 nm to 1 mm, by applying, to those regions to be bonded of a layer composed of a pulverulent substrate which does not absorb, or only poorly absorbs, the energy of the abovementioned wavelengths, a material comprising an absorber which can absorb the energy and dissipate the absorbed energy in the form of heat to its surrounding substrate, thereby bonding, via fusion or sintering, the regions mentioned of the substrate of the layer or, where appropriate, of a layer situated thereunder or thereabove. A printing head with one or more nozzles may be used to apply the absorber and any other additives, for example using the piezoelectric effect or the bubble jet principle, similar to that of an inkjet printer. The electromagnetic energy may be introduced in spot form or linear form or spread form, preferably linear or spread form, giving the process a speed advantage.

The present invention also provides an apparatus for the layer-by-layer production of three-dimensional objects which comprises
- a movable apparatus for the layer-by-layer application of a pulverulent substrate to an operating platform or to a layer of a treated or untreated pulverulent substrate (2) which may at this stage be present on the operating platform,
- an apparatus (3) movable in the x, y plane, for the application of a material (4) comprising an absorber and optionally of other additives to selected regions of the layer composed of pulverulent substrate, and
- an energy source for electromagnetic radiation, which radiates in an either non-coherent and/or non-oriented and/or non-monochromatic manner, of wavelength from 100 nm to 1 mm, using radiative heaters in the IR-A and/or IR-B region, or using lamps in the visible or IR-A, and/or IR-B region.

Alternatively, a movable operating platform may also be responsible for movements of the apparatuses or of the energy source and of the operating platform relative to one another. It is also possible to use the operating platform to realize the relative movements in the x direction and to use the respective apparatus or the energy source to realize the movements in the y direction, or vice versa.

The inventive process has the advantage of being simpler, faster, more precise, and more advantageous than conventional processes. The controlled action of energy at certain sites on the layer is achieved via an absorber which is applied to the desired regions of the layer and which is suitable for electromagnetic radiation of wavelength from 100 nm to 1 mm.

The inventive process is a simple way of achieving automated layer-by-layer construction of a three-dimensional object via use of either non-oriented and/or non-monochromatic and/or non-coherent energy sources of wavelength from 100 nm to 1 mm in combination with a suitable absorber. Powder not treated with absorber can simply be reused. In addition, specific properties, such as electrical conductivity, or inks can be included in the "printing" process. Using this method, the part can simultaneously be provided with selected properties.

The functional principle of the present inventive process for the production of three-dimensional objects is in principle based on the principle used in all of the other processes for rapid prototyping. The three-dimensional object is constructed in the form of layers. The method of construction is that parts of liquid layers (stereolithography) or powder layers (laser sintering) are secured or, respectively, melted, mutually or, respectively, with parts of layers situated thereunder, by introducing energy into these parts of the layers. The parts of the layers into which no energy has been introduced remain in the form of liquid or powder. Repetition of the application and melting process or, respectively, the process of securing powder or, respectively, liquid provides a three-dimensional object, layer-by-layer. Once the unconverted powder or, respectively, the unconverted liquid has been removed the result is a three-dimensional object whose resolution (in respect of contours) depends, if powder is used, inter alia on the layer thickness and the particle size of the pulverulent substrate used.

In contrast to the processes known hitherto, the energy is not supplied directly to the substrates to be bonded, but by way of an absorber, which absorbs the energy and dissipates it in the form of heat to its surrounding substrate. The result is a marked enlargement of the range of the pulverulent substrates that can be used, when comparison is made with conventional laser sintering. The inventive process introduces the energy into the absorber in the form of electromagnetic radiation which is either non-monochromatic and/or non-coherent and/or non-oriented, of wavelength from 100 nm to 1 mm, preferably via radiative heaters in the IR-A and/or IR-B region, or via lamps in the IR-A and/or IR-B region, or in the visible-light region, the energy being absorbed by the absorber, converted into heat, and dissipated into the directly adjacent pulverulent substrate which is incapable, or insufficiently capable, of absorbing the radiation from the abovementioned sources. "Insufficiently" means in the present instance that absorption of radiation via an energy source of wavelength from 100 nm to 1 mm cannot heat the pulverulent substrate sufficiently to enable it to bond via fusion or sintering to adjacent substrate particles, or that the time needed for this is very long. However, the heat dissipated from the absorber is sufficient to bond the pulverulent substrate adjacent to the absorber to itself and also to the absorber, via fusion or sintering. The inventive process thus produces three-dimensional objects via fusion or sintering of a pulverulent substrate.

The consequence of the application of the absorbers in step c), which is usually computer-controlled using CAD applications to calculate the cross-sectional areas, is that only treated pulverulent substrates are melted in a subsequent treatment step e). The material comprising absorber is therefore applied only to selected regions of the layer from a), which are within the cross section of the three-dimensional object to be produced. The actual method of application may, for example, use a printing head equipped with one or more nozzles. After the final treatment step e) for the final layer, the inventive process gives a matrix, some of whose powder material has been bonded, and which releases the solid three-dimensional object after cooling and removal of the unbonded powder.

The inventive process is described by way of example below, but there is no intention that the invention be restricted thereto.

The inventive process for producing a three-dimensional object comprises the steps of
a) providing a layer of a pulverulent substrate
b) controlling the temperature of the manufacturing chamber
c) selective application of an absorber in a suspension or of a liquid absorber via an inkjet process to the regions to be sintered
d) application of other specific liquids or suspensions with certain properties
e) selective melting of regions of the powder layer by means of introduction of electromagnetic energy, which is non-oriented and/or non-monochromatic and/or non-coherent, via a laser of wavelength from 100 nm to 1 mm, preferably by means of radiative heaters in the IR-A and/or IR-B region, or using lamps in the visible or IR-A, and/or IR-B region
f) cooling of the molten and non-molten regions to a temperature which allows the moldings to be removed intact
g) removal of the moldings
and also encompasses moldings produced by this process. Steps a) to e) here are repeated until the desired molding has been fashioned layer-by-layer. Step b) is material-dependent and therefore optional. Step d) is likewise optional. The thickness of the layer applied is, by way of example, from 0.03 to 2 mm, preferably from 0.08 to 0.2 mm.

An alternative sequence consists in omitting step e) in the first layer and carrying it out from the second layer onward as an alternative after step a). This leads to fusion of the powder particles precisely in the boundary layer between the uppermost powder layer and the powder layer situated thereunder, giving particularly good bonding and moreover increasing the amount of processing latitude, because the result is substantial elimination of curl (roll-up of the edges or ends of the molten regions).

An example of a method for preparing the pulverulent layer is application of a powder material as substrate to a base plate or to an existing layer treated in steps b) to e), if such a layer is present. The method of application may be doctoring, rolling, or broadcasting and subsequent stripping, or a similar method. The single precondition with which the provision of the layer has to comply is that the layer has uniform height. The height of the layer provided in step a) is preferably smaller than 3 mm, with preference from 30 to 2000 µm, and particularly preferably from 80 to 200 µm. The height of the layers here determines the resolution and therefore the smoothness of the external structure of the three-dimensional object produced. The base plate, or else the apparatus for providing the layer, may be designed with adjustable height so that after the step d) or e) has been carried out, either the resultant layer can be lowered by the height of the layer to be applied next or the apparatus can be raised by the difference in height of the next layer over the preceding layer.

Powder material preferably used as pulverulent substrate has a median grain size ($d_{50}$) of from 10 to 150 µm, particularly preferably from 20 to 100 µm, and very particularly preferably from 40 to 70 µm. However, depending on the intended use, it can be advantageous to use a powder material comprising particularly small particles, and also comprising particularly large particles. In order to realize three-dimensional particles with maximum resolution and maximum surface smoothness, it can be advantageous to use particles whose median particle size is from 10 to 45 µm, preferably from 10 to 35 µm, and very particularly preferably from 20 to 30 µm.

It is very difficult to process fine material smaller than 20 µm, in particular smaller than 10 µm, because it does not flow, and the bulk density falls drastically, and this can cause more production of cavities. To ease operation, it can be advantageous to use particles whose median size is from 60 to 150 µm, preferably from 70 to 120 µm, and very particularly preferably from 75 to 100 µm.

The pulverulent substrate used preferably comprises powder material which is prepared by milling, spraying and condensation in an inert gas, spraying followed by rapid solidification, precipitation, and/or anionic polymerization, or via a combination of these. This may be followed by a fractionation and/or provision of a powder-flow aid. A mechanical post-treatment can likewise be advisable, for example in a high-speed mixer, in order to round the sharp-edged particles produced during the milling process, thus making it easier to apply thin layers.

The grain size distribution may be selected as desired for the stated median grain sizes of the powder materials. It is preferable to use powder materials which have a broad or narrow grain size distribution, preferably a narrow grain size distribution; bimodal grain size distributions are also advantageous. Particularly preferred pulverulent materials for use in the inventive process have a grain size distribution in which the polydispersity, defined as the difference between the $D_{90}$ value and the $D_{10}$ value, based on the $D_{50}$ value, is from 0.05 to 15, preferably from 0.1 to 10, and particularly preferably 0.5 to 5. An example of the method for determining the grain size distribution is laser diffraction, using the MALVERN MASTERSIZER® S. The grain size distribution can be adjusted via conventional classification processes, e.g. pneumatic separation. Maximum narrowness of grain size distribution in the inventive process gives three-dimensional objects which have a very uniform surface and have very uniform pores, if pores are present.

At least some of the pulverulent substrate used can be amorphous, crystalline, or semicrystalline. Aromatic structures may moreover be present. Preferred powder material has a linear or branched structure. Particularly preferred powder material used in the inventive process comprises at least some material whose melting point is from 50 to 350° C., preferably from 70 to 200° C.

Suitable substrates in the inventive process are substances which, when compared with the selected absorber, are less effectively heated by electromagnetic radiation of wavelength from 100 nm to 1 mm. The pulverulent substrate used should moreover have adequate flowability in the molten state. Pulverulent substances which may in particular be used are polymers or copolymers selected from polyester, polyvinyl chloride, polyacetal, polypropylene, polyethylene, polystyrene, polycarbonate, polybutylene terephthalate, polyethylene terephthalate, polysulfone, polyarylene ether, polyurethane, polylactides, thermoplastic elastomers, polyoxyalkylenes, poly(N-methylmethacrylimides) (PMMI), polymethyl methacrylate (PMMA), ionomer, polyamide, copolyester, copolyamides, silicone polymers, terpolymers, acrylonitrile-butadiene-styrene copolymers (ABS), polyether sulfone, polyaryl sulfone, polyphenylene sulfide, polyaryl ether ketone, polyphthalamide, polyimide, polytetrafluoroethylene, or a mixture of these.

The pulverulent substrate used in the inventive process particularly preferably comprises a material which comprises a polyamide, preferably at least one nylon-6, nylon-11, and/or nylon-12, or which comprises a copolyester or comprises a copolyamide. Particularly dimensionally stable three-dimensional moldings can be produced by using polyamides. Particular preference is given to the use of nylon-12 powder, preferably prepared as described in DE 197 08 946, or else DE 44 21 454, and particularly preferably having a melting point and an enthalpy of fusion as stated in EP 0 911 142. They may be regulated, semiregulated, or unregulated, preferably unregulated. They may have a linear aliphatic structure or else have aromatic units. Preferred copolyamides or copolyesters used are those obtainable from Degussa AG with the trademark VESTAMELT®. Particularly preferred polyamides have a melting point, determined by means of differential scanning calometry (DSC) of from 76 to 159° C., preferably from 98 to 139° C., and very particularly preferably from 110 to 123° C. By way of example, the copolyamides may be prepared via polymerization of mixtures of suitable monomers, e.g. selected from laurolactam and/or caprolactam, as bifunctional component, suberic acid, azelaic acid, dodecanedioic acid, adipic acid, and/or sebacic acid as component bearing an acid function, and 1,6-hexanediamine, isophoronediamine and/or methylpentamethylenediamine as diamine. Aromatic units may also be used. Suitable other comonomers and rules for their selection are known to the person skilled in the art and described, by way of example, in J. G. Dolden, Polymer (1976, 17), pp. 875-892.

In order to improve the processibility of the pulverulent substrates, it can be advantageous to use a powder material which comprises additives. These additives may be powder-flow aids, for example. The pulverulent substrate used particularly preferably comprises from 0.05 to 5% by weight, with preference from 0.1 to 1% by weight, of additives. Examples of powder-flow aids may be fumed silicas, stearates, or other powder-flow aids known from the literature, e.g. tricalcium phosphate, calcium silicates, $Al_2O_3$, MgO, $MgCO_3$, or ZnO. By way of example, fumed silica is supplied by Degussa AG with the trademark AEROSIL®. It can also be advantageous, if absorber is indeed present in the pulverulent substrate used, but the amount of absorber is less than that which leads to undesired melting of unselected regions. The person skilled in the art can easily establish limits via exploratory experiments.

Alongside, or instead of, these in part inorganic powder-flow aids or other additives, inorganic fillers may also be present in a pulverulent substrate used according to the invention. The use of these fillers has the advantage that they substantially retain their shape through the treatment during the bonding process and therefore reduce the shrinkage of the three-dimensional object. Another possibility provided by the use of fillers is modification of the plastic and physical properties of the objects. For example, use of powder material which comprises metal powder can adjust not only the transparency and color of the object but also its magnetic or electrical properties. Examples of fillers which may be present in the powder material are glass particles, ceramic particles, or metal particles. Examples of typical fillers are metal granules, aluminum powder, steel shot or glass beads. It is particularly preferable to use powder materials in which glass beads are present as filler. In one preferred embodiment, the inventive powder material comprises from 1 to 70% by weight, preferably from 5 to 50% by weight, and very particularly preferably from 10 to 40% by weight, of fillers.

Alongside, or instead of, inorganic powder-flow aids or fillers, inorganic or organic pigments may also be present in a pulverulent substrate used according to the invention. These pigments may be not only color pigments which determine the perceived color of the three-dimensional object to be produced, but also pigments which affect the other physical properties of the three-dimensional articles to be produced, e.g. magnetic pigments or conductivity pigments, for example conductivity-modified titanium dioxide or tin oxide, which alter the magnetic properties and, respectively, the conductivity of the article. However, the powder material to be used particularly preferably comprises inorganic or organic color pigments selected from chalk, ocher, umber, green earth, burnt sienna, graphite, titanium white (titanium dioxide), white lead, zinc white, lithopone, antimony white, carbon black, iron oxide black, manganese black, cobalt black, antimony black, lead chromate, mennium, zinc yellow, zinc green, cadmium red, cobalt blue, Prussian blue, ultramarine, manganese violet, cadmium yellow, Schweinfurter green, molybdate orange, molybdate red, chrome orange, chrome red, iron oxide red, chromium oxide green, strontium yellow, metallic-effect pigments, pearlescent pigments, luminescent pigments using fluorescent and/or phosphorescent pigments, umber, gamboge, animal charcoal, Cassel brown, indigo, chlorophyll, azo dyes, indigoids, dioxazine pigments, quinacridone pigments, phthalocyanine pigments, isoindolinone pigments, perylene pigments, perinone pigments, metal complex pigments, alkali blue pigments, and diketopyrrolopyrrole. By way of example, further information relating to pigments which may be used may be found in Römpp Lexikon Chemie [Römpp Chemical Encyclopedia]—Version 2.0, Stuttgart/New York: Georg Thieme Verlag 1999, and in the references given therein. However, the concentration of these pigments in the powder must be selected so as to give, at most, very little absorption of the energy introduced; it must be below the threshold at which the powder particles sinter via the heat transferred to them.

Other substances which may be used as powder material are those which may be regarded as a specialized form of the abovementioned fillers or pigments. In powder material of this type, the powder comprises grains composed of a first material with a size smaller than the abovementioned dimensions for the powder material. The grains have been coated with a layer of a second material, the thickness of the layer having been selected in such a way that the powder material composed of the combination of grain of the first material and coating of the second material has the size stated above. The grains of the first material preferably have a size which deviates from the size of the powder material by less than 25%, preferably less than 10%, and particularly preferably less than 5%. The second material, which is the coating of the grains, is a material which, when compared with the selected absorber, is less effectively heated by electromagnetic radiation which is either non-coherent or non-oriented or non-monochromatic, of wavelength from 100 nm to 1 mm. The second material should moreover have adequate flowability in the heated state and be capable of sintering or fusion via exposure to heat, this heat being provided by the absorber. The coating material present in the pulverulent substrates (the powder materials) may in particular be the abovementioned polymers or copolymers, preferably selected from polyester, polyvinyl chloride, polyacetal, polypropylene, polyethylene, polystyrene, polycarbonate, polybutylene terephthalate, polyethylene terephthalate, polysulfone, polyarylene ether, polyurethane, thermoplastic elastomers, polylactides, polyoxyalkylenes, poly(N-methyl-methacrylimides) (PMMI), polymethyl methacrylate (PMMA), ionomer, polyamide, copolyester, copolyamides, silicone polymers, terpolymers, acrylonitrile-butadiene-styrene copolymers (ABS), polyether sulfone, polyaryl sulfone, polyphenylene sulfide, polyaryl ether ketone, polyphthalamide, polyimide, polytetrafluoroethylene, or a mixture of these or phenolic resins. The first material of this specialized form of the powder material may encompass grains, by way of example, composed of sand, ceramic, metal, and/or alloys. A particularly preferred powder material of this type is phenolic-resin-coated sand or thermoplastic-coated sand, known as molding sand.

If the absorber is capable of transferring a sufficient amount of heat, it is likewise possible for the powder material used to comprise metal powder, in particular powder of low-melting-point metals, e.g. lead or tin, or alloys which comprise, by way of example, tin or lead. This powder material, too, preferably has the abovementioned dimensions.

The inventive process can therefore produce three-dimensional objects which can be equipped with one or more functionalized layers. An example of a functionalization is the provision of conductive properties to the entire molding or else only to certain regions via application of appropriate pigments or substances, by analogy with the absorber, or via provision of a layer composed of a pulverulent substance in which these pigments are present.

The method for applying the absorber can be based on that described in WO 01/38061 for application of the inhibitor. The absorber is preferably applied using an apparatus movable in the x,y plane. The apparatus has the capability to deposit liquid and/or pulverulent absorbers at defined sites on the layer provided in step a). By way of example, the apparatus may be a printing head, as used in an inkjet printer and having one or more nozzles. The guiding of the apparatus for the positioning of the printing head may likewise take place in the same way as the guiding of the printing head in an inkjet printer. Using this apparatus, the absorber is applied at those sites on the layer provided in step a) at which the substrate is to be bonded via sintering or fusion.

Absorbers which can be used in the inventive process are any of those which are heated via electromagnetic radiation of wavelength from 100 nm to 1 mm.

In the simplest case, the absorber comprises what is known as a colorant. A colorant is any of the coloring substances to DIN 55944, these being divisible into inorganic and organic colorants, and also into natural and synthetic colorants (see Römpps Chemielexikon [Römpp's Chemical Encyclopedia], 1981, 8th edition, p. 1237). According to DIN 55943 (September 1984) and DIN 55945 (August 1983), a pigment is an inorganic or organic colorant whose color is non-neutral or neutral and which is practically insoluble in the medium in which it is used. Dyes are inorganic or organic colorants whose color is non-neutral or neutral and which are soluble in solvents and/or in binders.

However, the absorber may also gain its absorbent action by comprising additives. By way of example, these may be flame retardants based on melamine cyanurate (MELAPUR® from DSM) or based on phosphorus, preference being given to phosphates, phosphites, phosphonites, or elemental red phosphorus. Other suitable additives are carbon fibers, preferably ground, glass beads, including hollow beads, or kaolin, chalk, wollastonite, or graphite.

The absorber present in the inventive powder preferably comprises carbon black or CHP (copper hydroxide phosphate), or chalk, animal charcoal, carbon fibers, graphite, flame retardants, or interference pigments as principal component. Interference pigments are what are known as pearlescent pigments. Using the natural mineral mica as a basis, they are encapsulated with a thin layer composed of metal oxides, such as titanium dioxide and/or iron oxide, and are available with a median grain size distribution of from 1 to 60 μm. By way of example, interference pigments are supplied by Merck with the name IRIODIN®. The IRIODIN® product line from Merck encompasses pearlescent pigments and metal-oxide-coated mica pigments, and also the subclasses of: interference pigments, metallic-luster special-effect pigments (iron oxide coating on the mica core), silvery white special-effect pigments, gold-luster special-effect pigments (mica core coated with titanium dioxide and with iron oxide). The use of IRIODIN® grades in the IRIODIN® LS series is particularly preferred, namely IRIODIN® LS 820, IRIODIN® LS 825, IRIODIN® LS 830, IRIODIN® LS 835, and IRIODIN® LS 850. The use of IRIODIN® LS 820 and IRIODIN® LS 825 is very particularly preferred.

Other suitable materials are: mica or mica pigments, titanium dioxide, kaolin, organic and inorganic color pigments, antimony(III) oxide, metal pigments, pigments based on bismuth oxychloride (e.g. the BIFLAIR® series from Merck, high-luster pigment), indium tin oxide (NANO-ITO® powder from Nanogate Technologies GmbH or ADNANO™ ITO from Degussa), ADNANO™ zinc oxide (Degussa), lanthanum hexachloride, CLEARWELD® (WO 0238677), and also commercially available flame retardants which comprise melamine cyanurate or comprise phosphorus, preferably comprising phosphates, phosphites, phosphonites, or elemental (red) phosphorus.

If the intention is to avoid any adverse effect on the intrinsic color of the molding, the absorber preferably comprises interference pigments, particularly preferably from the IRIODIN® LS series from Merck, or CLEARWELD®.

The chemical term for CHP is copper hydroxide phosphate; this is used in the form of a pale green, fine crystalline powder whose median grain diameter is just 3 μm.

The carbon black may be prepared by the furnace black process, the gas black process, or the flame black process, preferably by the furnace black process. The primary particle size is from 10 to 100 nm, preferably from 20 to 60 nm, and the grain size distribution may be narrow or broad. The BET surface area to DIN 53601 is from 10 to 600 $m^2/g$, preferably from 70 to 400 $m^2/g$. The carbon black particles may have been subjected to oxidative post-treatment to obtain surface functionalities. They may be hydrophobic (for example PRINTEX® 55 or flame black 101 from Degussa) or hydrophilic (for example FW20 carbon black pigment or PRINTEX® 150 T from Degussa). They may have a high or low level of structuring; this describes the degree of aggregation of the primary particles. Specific conductive carbon blacks can be used to adjust the electrical conductivity of the components produced from the inventive powder. Better dispersibility in both the wet and the dry mixing processes can be utilized using carbon black in bead form. It can also be advantageous to use carbon black dispersions.

Animal charcoal is an inorganic black pigment comprising elemental carbon. It is composed of from 70 to 90% of calcium phosphate and from 30 to 10% of carbon. Density is typically from 2.3 to 2.8 g/ml.

The absorbers may, by way of example, be in pellet form or in powder form or liquid form. For distribution within a printing head with one or more fine nozzles it is advantageous for the particles to have maximum fineness, and therefore excessively coarse particles or pellets can be milled or further milled, preferably at low temperatures, and then optionally classified.

These additives used here as absorbers are obtainable, by way of example, from Merck with the name IRIODIN®.

Carbon black means commercially available standard carbon blacks, such as those supplied by the companies Degussa AG, Cabot Corp., or Continental Carbon.

Commercially available examples of suitable absorbers in a general sense are IRIODIN® LS 820 or IRIODIN® LS 825, or IRIODIN® LS 850 from Merck. Examples which may be mentioned for the carbon black are PRINTEX® 60, PRINTEX® A, PRINTEX® XE2, or PRINTEX® Alpha from Degussa. Degussa likewise supplies suitable CHP with the trademark VESTODUR® FP-LAS.

It is advantageous to prepare a liquid which comprises the absorber and which can be applied in a printing head, like an ink, to the pulverulent substrate. It is possible to use mixtures of solid, liquid, or solid and liquid absorbers. It can also be advantageous for absorbers in solid form to be suspended in liquids which are not absorbers, in order to achieve better distribution of the absorber in solid form over the entire depth of the layer provided. It is also advantageous to add specific rheological additives which inhibit sedimentation of the solid absorber in the liquid. Another advantage can be achieved if surfactants, such as alkylphenol ethoxylates, fatty alcohol ethoxylates, fatty acid ethoxylates, fatty amine ethoxylates, are added to the absorber, in particular to the liquid absorber or to the suspension of a solid absorber in a liquid, in order to improve the wetting of the substrate. The liquid may—with no intention of restricting the invention thereto—comprise water, preferably distilled, or alcohols, such as isopropanol, glycerol, diethylene glycol.

The use of commercially available dispersions can be particularly advantageous, examples being those from the DERUSSOL® product line from Degussa.

The use of a liquid absorber, such as CLEARWELD®, is likewise advantageous.

Many absorber/substrate combinations may moreover be considered for use in this inventive process, but an important factor for the process is an adequately large difference between absorber and substrate in the ability to be excited via electromagnetic radiation of wavelength from 100 nm to 1 mm, so that the matrix obtained at the end of the process has a clear boundary between molten (i.e. absorber-treated) substrate and non-molten substrate. This is the only way of ensuring that the three-dimensional object produced has a sufficiently smooth outline and can be released easily from the unbonded substrate. The precision of the process is superior to the laser sintering process, by way of example, because it permits much greater control of introduction of the energy.

In order to allow a sufficient amount of heat transfer from absorber to the substrate for a sufficient time, the boiling point of the absorber, or in the case of a mixture of absorbers the boiling point of at least one absorber, should be higher than the melting point of the substrate used. The parameters relating to the application of the absorber-containing liquid, and the properties of the powder and of the absorber, and also of the entire liquid, have to be balanced with respect to one another in order that, particularly if a liquid absorber is used, the absorber does not permeate through the layers but is absorbed exclusively by the powder regions to be wetted. An example of a balancing method is adjustment of the viscosity, and the amount used, of the absorber-containing liquid. The amount of the liquid used here is in particular dependent on the thickness of the powder layer, on the porosity of the powder, and on the particle size and the content of liquid or solid absorber. The ideal amount and viscosity for each of the combinations of materials can be determined in simple preliminary experiments. To adjust the viscosity, use can be made of known thickeners, such as fumed silicas, or else organic agents. It is also advantageous for the absorber-containing liquid to comprise wetting agents and/or biocides and/or moisture retainers. The liquid may comprise, by way of example, water, preferably distilled, or solvents or alcohols. The liquid comprising absorber(s) may remain in the melt and, respectively, in the molding. This can indeed be advantageous when reinforcement occurs or when other properties are adjusted via the absorber (electrical or magnetic conductivity). The carrier liquid, if such a liquid has been used, either likewise remains within the component or vaporizes or evaporates. The absorbers, liquids, and other additives used are advantageously non-toxic substances which permit problem-free operation in an office environment.

The energy needed for heating the absorber is introduced in the form of electromagnetic radiation which is either non-monochromatic and/or non-coherent and/or non-oriented, in the region from 100 nm to 1 mm, preferably by means of radiative heaters in the IR region or using lamps in the IR region, or in the visible-light region. It can be advantageous for the layers to be sintered to be brought to an elevated temperature, via introduction of heat, or to be kept at an elevated temperature below the melting or sintering point of the polymer used. This method can reduce the amount of electromagnetic energy for the selective melting process. A precondition for this is the presence of a temperature-controlled construction space, but it reduces the likelihood of curl (roll-up of the corners and edges out of the plane of construction, which can make it impossible to repeat step a)). It can also be advantageous for the absorber or the absorber-containing liquid to be preheated.

The radiation required for the inventive process is generated via an energy source which emits electromagnetic radiation in the region from 100 nm to 1 mm. Because this is expressly not laser radiation, the radiation lacks at least one of the following features: coherent, monochromatic, oriented. The form of the energy source may be spot form or linear form, or else spread form. It is also possible to combine two or more energy sources to permit irradiation of a relatively large area in a single step.

However, introduction of energy in linear form or indeed in spread form is highly advantageous in the present process, because, of course, the selectivity is intrinsically provided for each layer by way of the absorber or, respectively, absorber-containing liquid applied selectively via an inkjet process. This makes the process faster.

The inventive process can produce three-dimensional moldings. After conclusion of the inventive process, these pre-dimensional objects produced layer-by-layer are finally present within a matrix which is formed from a plurality of layers. The object can be removed from this matrix, which is composed of bonded and unbonded pulverulent substrate and also of absorber, while the unbonded substrate can be reintroduced, where appropriate after treatment, e.g. via sieving. The inventive moldings may comprise fillers, selected from glass beads, silicas, or metal particles.

The inventive process is preferably carried out in an inventive apparatus for the layer-by-layer production of three-dimensional objects, which comprises a movable apparatus for the layer-by-layer application of a pulverulent substrate to an operating platform or to a layer of a treated or untreated pulverulent substrate (2) which may at this stage be present on the operating platform, an apparatus (3) movable in the x, y plane, for the application of a material (4) comprising an absorber and optionally of other additives to selected regions of the layer composed of pulverulent substrate, and an energy source for electromagnetic radiation, which radiates in either a non-coherent and/or non-oriented and/or non-monochromatic manner, of wavelength from 100 nm to 1 mm, preferably using radiative heaters in the IR-A and/or IR-B region, or using lamps in the visible or IR-A, and/or IR-B region.

As an alternative, a movable operating platform may also be responsible for movements of the apparatuses and, respectively, of the energy source, and of the operating platform relative to one another. It is also possible to use the operating platform to realize the relative movements in the x direction and to use the respective apparatus or, respectively, the energy source to realize the movements in the y direction, or vice versa.

The apparatus has preferably been equipped with a plurality of storage vessels from which the pulverulent substrate to be processed can be introduced into the apparatus for generating the layers and the absorber(s) used can be introduced into the apparatus for the application of an absorber to selected regions of the layer composed of pulverulent substrate. By using printing heads with one or more nozzles and providing a mixer, it is possible for the absorber mixture used at particular zones of the layer, e.g. at particularly filigree regions or, for example, at the edge of the object to be produced, to differ from that used in the core region of the object to be produced. Using this method, there can be different introduction of energy at different positions in the layer.

The present invention also provides the powder material as described above, suitable for use in the inventive process and in particular featuring a median grain size from 10 to 150 µm and comprising at least one polymer or copolymer selected from polyester, polyvinyl chloride, polyacetal, polypropylene, polyethylene, polystyrene, polycarbonate, polybutylene terephthalate, polyethylene terephthalate, polysulfone, polyarylene ether, polyurethane, thermoplastic elastomers, polylactides, polyoxyalkylenes, poly(N-methylmethacrylimides) (PMMI), polymethyl methacrylate (PMMA), ionomer, polyamide, copolyester, copolyamides, silicone polymers, terpolymers, acrylonitrile-butadiene-styrene copolymers (ABS), polyether sulfone, polyaryl sulfone, polyphenylene sulfide, polyaryl ether ketone, polyimide, polytetrafluoroethylene, or a mixture of these.

FIG. 1 gives a more detailed explanation of the inventive process and the inventive apparatus, but there is no intention that the invention be restricted to this embodiment. FIG. 1 is a diagram of the inventive apparatus. Untreated pulverulent substrate (2), forming an initial charge in a storage vessel (1), is built up to give a matrix (8) on a movable base (6). By means of a doctor blade (2), the substrate is distributed to give thin layers on the movable base or, respectively, on previously applied layers. The absorber (4) or, respectively, the absorber-containing liquid is applied to selected regions of the layer composed of pulverulent substrate by way of an apparatus (3) movable in the x, y plane. After each treatment with an absorber, a fresh layer of the pulverulent substrate is applied. Those sites on the applied substrate that have been treated with the absorber are bonded by means of energy introduced of wavelength from 100 nm to 1 mm, for example via a radiative heater or a lamp (5), to give a three-dimensional object, e.g. a plaque (7). This step can also take place before the application of the next powder layer.

The invention encompasses moldings produced by the process described. These may be used as prototypes, or else in pilot runs, short runs, or mass production. These moldings may be used in a very wide variety of applications, e.g in the aircraft and aerospace sectors, medical technology, in the automotive industry, in mechanical engineering, and in the entertainment industry, but the invention is not limited thereto.

The examples below provide more detailed explanation of the inventive process, but there is no intention that the invention be restricted thereto.

EXAMPLE 1

Production of a Plaque from a Copolyamide by Means of a Halogen Lamp

An open-topped box 10×10 cm, was provided with a base which can be moved by way of a spindle. The base was moved to a position half a centimeter from the upper edge; the remaining space was filled with powder, which was smoothed using a metal plate. The apparatus described was used to produce a model of a plaque with dimensions 3*20*1 mm$^3$ from a copolyamide powder (VESTAMELT® 170, Degussa AG, Marl, Germany). The absorber used comprised a suspension based on CHP (VESTODUR® FP-LAS from Degussa), comprising 35% by weight of distilled water, 25% by weight of CHP, and 40% by weight of isopropanol. The operating temperature of the apparatus was about 40° C. The mask used comprised a metal plate with a cut-out of dimensions 3*20 mm, placed over the box. The suspension was applied by spraying, using a pump spray. Care had to be taken here that wetting was uniform, and also to avoid droplets. The protective covering was then removed. For each layer, the halogen lamp, power 500 Watts, was moved once at a velocity of 50 mm/sec across the powder bed, and specifically at 6 mm distance. The wavelength of the halogen lamp covers a large region of the spectrum, mainly in the infrared regions. This is an Osram Haloline halogen lamp of length about 12 cm. To improve energy yield, the halogen lamp is used in a holder which has a reflector which reflects the radiation mainly in the direction of the powder bed. After an irradiation, the platform of the box was lowered by 0.3 mm, and the above procedures were repeated until the component had been finished. The $D_{50}$ value for the powder was 60 µm.

EXAMPLE 2

Production of a Plaque from Nylon-12 by Means of an Incandescent Lamp

Using an apparatus similar to that described above, another plaque of dimensions 3*20*1 mm$^3$ was produced from a nylon-12 powder (EOSINT® P PA 2200, EOS GmbH Electro Optical Systems, Krailling, Germany). In this case, the operation did not use a mask but used a printing head which applies the liquid in a manner similar to the inkjet process. The absorber used comprises IRIODIN® LS 835. The liquid was composed of 30% of IRIODIN®, 59% of isopropanol, and 1% of PRIL® (Henkel). The operating temperature of the apparatus is about 160 C. The incandescent lamp used, an ORAM CONCENTRA SPOT CONC® R80 100 Watt Reflektor, has peak output in the near infrared region. The height of the powder layers applied was 0.15 mm. The distance between powder bed and lamp was 20 mm, and the period of exposure to the source was about 30 seconds per layer. The powder used had a $D_{50}$ value of 55 µm.

EXAMPLE 3

Production of a Cylinder from Copolyamide by Means of a Halogen Source

The apparatus disclosed in example 2 is used to produce a cylinder of diameter 22 mm and height 4 mm from a copolyamide (VESTAMELT® X1310). Absorbers used here comprise SICOPAL® Green and SICOPAL® Blue. The two absorbers were applied using the inkjet process, so that on each occasion half of the cross section was wetted by the blue pigment and the other half by the green pigment. This procedure could manufacture a two-color component. The liquid was composed of 25% by weight of the BASF pigments SICOPAL® Green and, respectively, SICOPAL® Blue, 50% of isopropanol, 24% of distilled water, and 1% of glycerol. The energy source used comprised a 35 Watt Sylvania SUPERIA® 50 halogen lamp. The distance between powder bed and lamp was 20 mm, and the period of exposure to the source was about 20 seconds per layer. The height of the powder layer was 0.2 mm. The $D_{50}$ value of the powder was 55 µm.

EXAMPLE 4

Production of a Cone from Copolyamide by Means of a Short-arc Xenon Lamp

The diameter of the cone to be produced was 25 mm and its height was 25 mm. The powder used comprised VESTAMELT® X1316. The liquid was applied using the inkjet process. The absorber used comprised a suspension based on carbon black (PRINTEX® alpha), comprising 40 percent by weight of distilled water, 30% of PRINTEX® alpha, and 30% of isopropanol. The operating temperature of the apparatus is about 50° C. The energy source used comprised an OSRAM XBO® 700W/HS OFR short-arc xenon lamp, positioned 20 mm above the powder bed. The period of exposure to the lamp was 10 seconds per layer. The $D_{50}$ value for the powder was 60 µm. The powder bed height was 0.15 mm.

What is claimed is:

1. A process for producing a three-dimensional object, the process comparing:
    a) providing a layer of a pulverulent substrate, wherein the pulverulent substrate is a powder material which is not coated, and wherein the pulverulent substrate comprises at least one homo- or copolymer selected from the group consisting of polyester, polyvinyl chloride, polyacetal, polypropylene, polyethylene, polystyrene, polycarbonate, polybutylene terephthalate, polyethylene terephthalate, polysulfone, polyarylene ether, polyurethane, thermoplastic elastomers, polylactides, polyoxyalkylenes, poly(N-methylmethacrylimides) (PMMI), polymethyl methacrylate (PMMA), ionomer, polyamide, copolyester, copolyamides, silicone polymers, terpolymers, acrylonitrile-butadiene-styrene copolymers (ABS), polyether sulfone, polyaryl sulfone, polyphenylene sulfide, polyaryl ether ketone, polyimide, polytetrafluoroethylene, and a mixture of these,
    b) controlling the temperature of a manufacturing chamber by supplying heat to said layer to bring said layer to an elevated temperature or to maintain said layer at an elevated temperature below the melting or sintering temperature of the polymer in said pulverulent substrate,
    c) selectively applying an absorber in a suspension or of a liquid absorber via an inkjet to at least one region of the layer to be sintered,
    e) selectively melting the at least one region of the layer of the pulverulent substrate by applying electromagnetic energy emitted by a radiative heater in the IR-A region, and/or a radiative heater in the TR-B region, or emitted by a lamp in the visible region or a lamp in the IR-A region, and/or a lamp in the IR-B region,
    f) cooling of the molten and non-molten regions obtained in e) to a temperature which allows formed moldings to be removed intact, and
    g) removing the moldings intact, thereby obtaining the three-dimensional object,
    wherein the selectively applying an absorber to the at least one region in c) includes raising the temperature of the at least one region by preheating the absorber to a temperature higher than the temperature of the at least one region and applying the preheated absorber to the at least one region.

2. The process as claimed in claim 1, wherein e) is first carried out once, and then a) to c) are carried out once, and then b) is carried out and a) is carried out again once, and then the other steps are carried out in the sequence c), a), b), and e).

3. The process as claimed in claim 1, wherein the pulverulent substrate has a median grain size of from 10 to 150 µm.

4. The process as claimed in claim 1, wherein the electromagnetic energy is emitted by a radiative heater in the near or middle infrared region.

5. The process as claimed in claim 1, wherein the electromagnetic energy is emitted by a lamp in the IR region or in the visible-light region.

6. The process as claimed in claim 1, wherein the electromagnetic energy is emitted by an incandescent lamp.

7. The process as claimed in claim 1, wherein the electromagnetic energy is emitted by a gas discharge lamp.

8. The process as claimed in claim 1, wherein the electromagnetic energy from a source is emitted in a spot, linear, or spread form.

9. The process as claimed in claim 1, wherein the absorber comprises at least one colorant.

10. The process as claimed in claim 9, wherein the colorants comprise at least one pigment.

11. The process as claimed in claim 9, wherein the colorants comprise at least one dye.

12. The process as claimed in claim 9, wherein the absorber also comprises distilled water, at least one alcohol, or at least one other solvent.

13. The process as claimed in claim 9, wherein the absorber also comprises at least one selected from the group consisting of a surfactant, a wetting agent, a biocide and a moisture retainer.

14. The process as claimed in claim 1, wherein the absorber comprises at least one component selected from the group consisting of carbon black, CHP, animal, charcoal, graphite, carbon fibers, chalk, and at least one interference pigment.

15. The process as claimed in claim 1, wherein the absorber comprises at least one component selected from the group consisting of carbon black, CHP, animal charcoal, graphite, carbon fibers, chalk, and at least one interference pigment.

16. The process as claimed in claim 1, wherein the absorber comprises at least one flame retardant based on phosphorus or melamine cyanurate.

17. The process as claimed in claim 1, wherein said pulverulent substrate further comprises from 0.05 to 5% by weight of a powder-flow aid.

18. The process as claimed in claim 1, wherein said pulverulent substrate further comprises at least one inorganic fillers.

19. The process as claimed in claim 18, wherein said inorganic filler comprises glass beads.

20. The process as claimed in claim 1, wherein said pulverulent substrate further comprises at least one inorganic or organic pigment.

* * * * *